(12) United States Patent
Steiger et al.

(10) Patent No.: US 7,787,582 B2
(45) Date of Patent: Aug. 31, 2010

(54) CONTROL UNIT

(75) Inventors: Eckard Steiger, Stuttgart (DE);
Christian Ohl, Pfullingen (DE);
Hartmut Schumacher, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 196 days.

(21) Appl. No.: 10/524,702

(22) PCT Filed: Feb. 24, 2003

(86) PCT No.: PCT/DE03/00563

§ 371 (c)(1),
(2), (4) Date: Oct. 13, 2005

(87) PCT Pub. No.: WO2004/021093

PCT Pub. Date: Mar. 11, 2004

(65) Prior Publication Data

US 2006/0123307 A1   Jun. 8, 2006

(30) Foreign Application Priority Data

Aug. 22, 2002  (DE) ................................ 102 38 529

(51) Int. Cl.
*H04L 23/00* (2006.01)
(52) U.S. Cl. .................. 375/377; 375/219; 375/220; 375/222; 375/242; 700/67; 700/79; 700/87
(58) Field of Classification Search .................. 700/1, 700/40, 67, 80, 258, 79; 720/130; 714/43; 375/242–243, 220, 377, 130, 219, 222; 701/29, 701/34, 35, 45; 702/182
See application file for complete search history.

(56) References Cited

U.S. PATENT DOCUMENTS

| 6,778,867 | B1 * | 8/2004 | Ziegler et al. .................. 700/79 |
| 7,375,623 | B2 * | 5/2008 | Steiger ........................ 340/438 |
| 7,600,642 | B2 * | 10/2009 | Deppermann ................ 209/552 |
| 2001/0035816 | A1 * | 11/2001 | Beigel et al. ............. 340/10.42 |
| 2001/0037491 | A1 * | 11/2001 | Boggs et al. .................... 717/4 |
| 2002/0051225 | A1 * | 5/2002 | Karasawa ................... 358/437 |

(Continued)

FOREIGN PATENT DOCUMENTS

DE    100 49 905    10/2001

(Continued)

OTHER PUBLICATIONS

A Generic Multielement Microsystem for Portable Wireless Applications By Mason et al. (Proceedings of IEEE, vol. 86, No. 8, Aug. 1998) pp. 1733-1744.*

(Continued)

*Primary Examiner*—Shuwang Liu
*Assistant Examiner*—Hirdepal Singh
(74) *Attorney, Agent, or Firm*—Kenyon & Kenyon LLP

(57) ABSTRACT

A control unit in which at least one inertial sensor and a processor are accommodated in a housing. The data transmission between the inertial sensor and the control unit is performed digitally. The transmission may be provided with error bits or status bits. The data transmission is configured to be bidirectional in particular. Four lines are provided between the control unit and the sensor, one of the lines being used for selecting the sensor.

13 Claims, 2 Drawing Sheets

U.S. PATENT DOCUMENTS

2002/0173930 A1\* 11/2002 Perner .................. 702/130
2002/0194548 A1\* 12/2002 Tetreault .................. 714/43

FOREIGN PATENT DOCUMENTS

| DE | 10049905 | 10/2001 |
| --- | --- | --- |
| DE | 100 32 216 | 1/2002 |
| DE | 100 36 643 | 2/2002 |
| JP | 11086176 | 3/1999 |
| JP | 2000074707 | 3/2000 |
| JP | 2000270384 | 9/2000 |
| WO | WO 99/12779 | 3/1999 |
| WO | WO 0121447 | 3/2001 |

OTHER PUBLICATIONS

Mason et al.; A Generic Multielement Microsystem for Portable Wireless Application; Proceedings of The IEEE, NY; Aug. 1998-08); pp. 1733-1746.

Yazdi et al; A Generic Interface Chip for Capacitive Sensors in Low-Power Multi-Parameter Microsystems; Sensors And Actuators A, Elsevier Sequoia S.A., Lausanne, Ch; Sep. 1, 2000; pp. 351-361.

Zhou; Communications Buses and Protocols for Sensor Networks; Online!; Jul. 4, 2002; pp. 244-257.

Boterenbrood; B-Sensor With Addressable Serial Peripheral Interface User Manual v1.5; Internet Article—Online!; Apr. 5, 2001.

\* cited by examiner

CONTROL UNIT

CROSS-REFERENCE TO RELATED APPLICATIONS

This application claims the benefit of and priority to PCT International Patent Application No. PCT/DE03/00563, filed on Feb. 24, 2003, and to German Patent Application No. 102 38 529.7, which was filed in Germany on Aug. 22, 2002.

FIELD OF THE INVENTION

The present invention is directed to a control unit including a processor and at least one inertial sensor in a housing.

SUMMARY OF THE INVENTION

The control unit according to the present invention has the advantage that the digital transmission between the processor and the inertial sensor in the control unit is fail-safe with respect to electromagnetic interferences, shunts, and humidity. This advantage is important at high signal resolution in particular. This advantage has an important effect in the ever decreasing internal control unit voltage levels which are contingent on the ever decreasing processor levels. Moreover, the digital transmission enables easy identification of an erroneous transmission. This makes direct and measured value-independent analysis of the transmitted sensor information possible. An inertial sensor is understood to be an acceleration sensor and/or a yaw rate sensor.

It is particularly advantageous that the data transmission is achieved via a serial synchronous interface. Multiple sensors in the control unit may be connected to this serial interface. The use of a synchronous interface enables easier processing of the signals.

Furthermore, it is an advantage that transmission of at least one error bit and at least one status bit is provided. The error bit enables the detection and identification of transmission errors in order to implement adequate measures if needed. Such measures may be an error correction from the received data or switching of the function state of the system or the control unit, e.g., faulty operation, error message output, warning lamp switch-on, or re-requesting the transmitted data, preferably in a data message, i.e., in a frame. The status bit, for example, enables the processor to recognize the operating state of the sensor, e.g., running sensor test, offset regulation mode, or initializing phase. More than one error bit and/or status bit may be used.

Furthermore, it is an advantage that the data transmission is designed to be bidirectional. This makes it possible for the sensor to transmit measuring data to the processor and for the processor in turn to put the sensor into a certain state or to retrieve certain data therefrom. This is not necessarily measuring data only, but also internal information about the sensor, such as a self testing result or the current operating state in which the sensor is operating (offset regulation mode, running self test, initializing phase, etc.).

Four lines are provided for the data transmission, three lines thereof being connected to each sensor, situated in the control unit and taking part in this data transmission, and the fourth line being provided for each individual sensor. This fourth line provides for the activation of the data transmission with the respective sensor. If three sensors are connected to the data transmission according to the present invention, three such lines, which run from the processor to these three sensors, are provided in order to activate the individual sensors at the appropriate points in time. Moreover, there are the additional three lines which are provided for the actual data transmission. This is generally referred to as serial peripheral interface (SPI) which has a clockline, an input line, an output line, and the sensor select line.

It is also advantageous that the at least one inertial sensor may have a multi-channel design. Multi-channel operation means that more than one measuring mode is possible using one sensor.

Moreover, it is advantageous that the data transmission is configured for triggering the switch-over from one operating state to another operating state of the at least one inertial sensor.

Finally, it is also advantageous that the control unit according to the present invention is usable in a restraining means and/or a vehicle dynamics control system and/or a navigation system and/or a cross-system sensor box.

DETAILED DESCRIPTION

Figure 1:
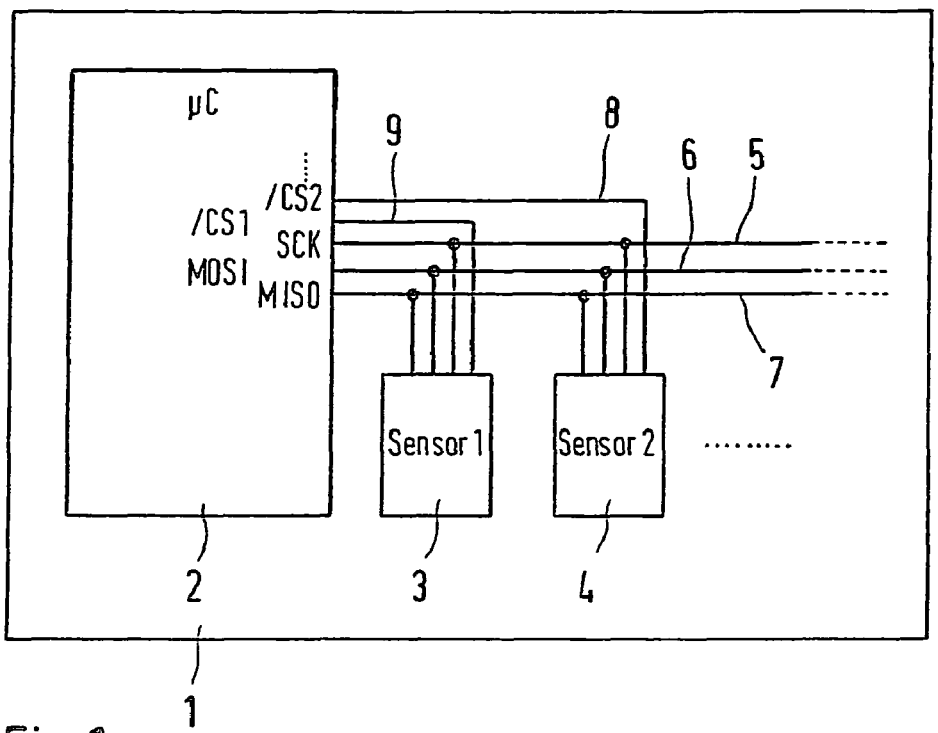
FIG. 1 shows a block diagram of the control unit according to the present invention.

Inertial sensors, which are currently used in a control unit for restraint systems, transmit their measuring signal analog to an analog input of a microcontroller in the control unit. The microcontroller has an analog-to-digital converter. Since acceleration sensors and yaw rate sensors are understood to be inertial sensors, acceleration sensor signals or yaw rate sensor signals are represented by analog voltage time characteristics. The instantaneous value of the deviation from a quiescent value, typically half the supply voltage of the inertial sensor, represents the current measured value. The assignment takes place via sensor-specific sensitivities which are typically indicated in millivolts per acceleration or millivolts per angle change per time. Further signal processing, which started with the analog-to-digital conversion, subsequently takes place in the microcontroller.

The susceptibility of the transmitted analog signal represents a substantial disadvantage in this technology. Electromagnetic interferences, shunts due to humidity, and other interferences may alter the sensor output signal to a degree critical for the restraint system. This may result in the simulation of accelerations or yaw rates, which in turn may result in the danger of non-functioning or restricted functioning or false triggering. This disadvantage is all the more a factor as the demands on signal resolution increase and the internal control unit voltage levels decrease. The fact that errors in an analog transmission are identifiable only to a very limited degree represents an additional disadvantage. These above-mentioned interferences alter the sensor output signal in a way which is only ascertainable via signal plausibility checks, but not via direct and measured value-independent analysis of the transmitted sensor output information.

The present invention provides digital transmission between the inertial sensor and the processor in the control unit. A serial synchronous interface is preferably used for this purpose, the digital signals exhibiting higher transmission reliability. The transmitted information is extremely robust with respect to interference-related voltage level changes, since the voltage ranges, which are assigned to a logic one or zero, are relatively great, typically greater than or equal to 80% of the voltage level or less than or equal to 20% of the voltage level. If, however, transmission errors occur despite the increased robustness, these errors could be detected in all likelihood. With regard to the respective processor request, non-defined digital words may be easily identified by the system. Moreover, transmission of status bits and error bits, as well as transmission of whole data words, which contain a detailed description of the sensor state, is provided and possible without relevant additional technical complexity. Constant status checks enable the cyclical and/or permanent recognizability of systematic transmission errors.

It is also an advantage that in addition to the transmission of information from the inertial sensor to the processor, instructions are also transmitted in the opposite direction via the same interface. This makes it possible to establish control instructions, such as a sensor test, or on- and off-switching of a sensor-internal offset regulation, or switching from one operating state to another, without additional system-related expense for hardware and without additionally necessary sensor bits.

The easily possible designation of the transmitted digital words using status bits is a particular advantage. While the sensor self-test is activated, a corresponding test status flag makes it possible for the test-contingent sensor output signal to be known to the system as such, thereby making a reliable system check possible. The utilization of the present invention is also possible and sensible in other automotive applications in which inertial sensors are used in connection with processors. Examples of these applications are the vehicle dynamics control system, a sensor box or sensor cluster, or the vehicle navigation system.

The present invention relates in particular to a restraint system control unit and inertial sensors used therein, i.e., acceleration sensors and/or yaw rate sensors which may have a one-channel or a multi-channel design. The sensor signals are provided in a sensor ASIC (application-specific integrated circuit) as digital values. This means that the sensor is designed as an intelligent sensor. In addition to the actual sensing element, such an intelligent sensor also has a measuring signal amplifier, an analog-to-digital converter, and other signal conditioning modules. Finally, an interface module is also present in the sensor ASIC to ensure digital transmission to the processor.

In particular, an interface known as a serial peripheral interface is used as the communication interface between the sensor and the processor, the processor functioning as the master and the inertial sensors as the slaves. The SPI bus is made up of four lines: first the SPI clock (SCK), i.e., a clockline, followed by the master-out slave-in (MOSI) line and the master-in slave-out (MISO) line. These two lines are used for the actual data transmission. The fourth line is known as the chip select line (CS). It establishes a separate link between each individual inertial sensor and the processor, i.e., there are as many CS lines as there are slaves. The other three lines, the SCK line, the MOSI line, and the MISO line, are only present once and all sensors are connected to these three lines. In a non-activated chip select, MISO is a high-resistance line, i.e., in a state known as "tristate." The SPI supports combined write-read cycles and uses a uniform SPI frame for writing and reading. For this reason, the processor transmits the data according to the SPI instruction starting with the MSB (most significant bit). After receipt of the SPI instruction, the inertial sensor transmits the corresponding data to the processor, likewise starting with the MSB.

An SPI frame is used here which transmits a 7-bit instruction and 8-bit data in a 16-bit frame during the active chip select phase. One bit is provided for the required response time between the instruction and data word.

An additional SPI frame is used which allows transmission of a 12-bit data word, which contains the acceleration or yaw rate information, within the 16-bit frame. The length of the instruction is then limited to 3 bits, one bit being provided for the response time.

FIG. 1 shows a block diagram of the control unit according to the present invention. A processor 2 and, as an example, two inertial sensors 3 and 4 are situated in a housing 1. Sensors 3 and 4 are each connected to processor 2 via four lines. Three lines, i.e., lines 5 through 7, are the same for both sensors 3 and 4, lines 8 and 9 being assigned only to the individual sensor. Line 9 is assigned to sensor 3 and line 8 is assigned to sensor 4. Lines 8 and 9 act as the above-mentioned chip select lines, i.e., they activate the data transmission to the respective sensor. Line 5 is the clockline, while line 6 enables data transmission from processor 2 to sensors 3 and 4 and line 7 enables data transmission of sensors 3 and 4 to processor 2. It is possible for more than the two sensors 3 and 4 to be connected to the processor via these lines, the additional sensors having their own chip select lines. Moreover, it is possible for only a single sensor to be connected to processor 2. Other components of the control unit are not shown here. These may include, for example, interface modules for communication outside of the control unit, an ignition circuit control and other modules such as a plausibility switch. Other modules may also be connected to these SPI lines in addition to sensors 3 and 4.

Figure 2:
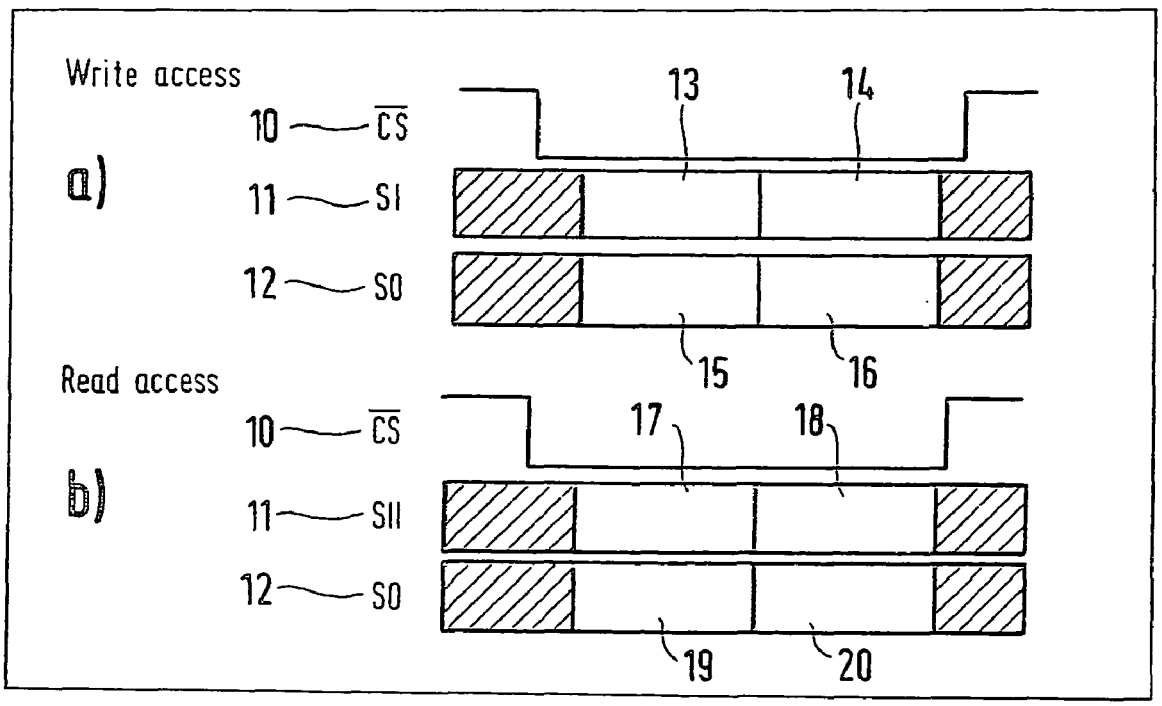
FIG. 2a shows an information transmission from the processor to the inertial sensor.
FIG. 2b shows an information transmission from the sensor to the processor.

FIG. 2a shows the data messages which are carried out in a data transmission from the processor to the respective sensor, i.e., the frame for the standard write access. Signal 10 is the chip select signal and provides, with the low level, for communication between the processor and the respective sensor, i.e., data may be transmitted via lines 6 and 7. The 7-bit write instruction, e.g., an instruction for switching on the offset regulation, and 8-bit supplementary data, e.g., for assigning the instruction to a certain measuring channel or for the switching information on/off associated with the instruction, are transmitted to the sensors in fields 13 and 14. In row 12, the signal is transmitted from the sensor to processor 2. In return, 8-bit data including status and error information is transmitted to processor 2 in field 15. Field 16 is not used here.

FIG. 2b shows the frame for standard read access. Rows 10, 11, and 12 are shown again. The low level in row 10 indicates that the transmission between the sensor and the processor is taking place. The 7-bit read instruction, e.g., the instruction for reading out the operating state regarding the offset regulation, is transmitted in row 11 in field 17. Field 18 is not used here. In row 12, the signal is transmitted from the sensor to the processor. In return, 8-bit data including status and error information is re-transmitted to processor 2 in field 19. Field 20 does not contain any useful information in the present case.

Figure 3:
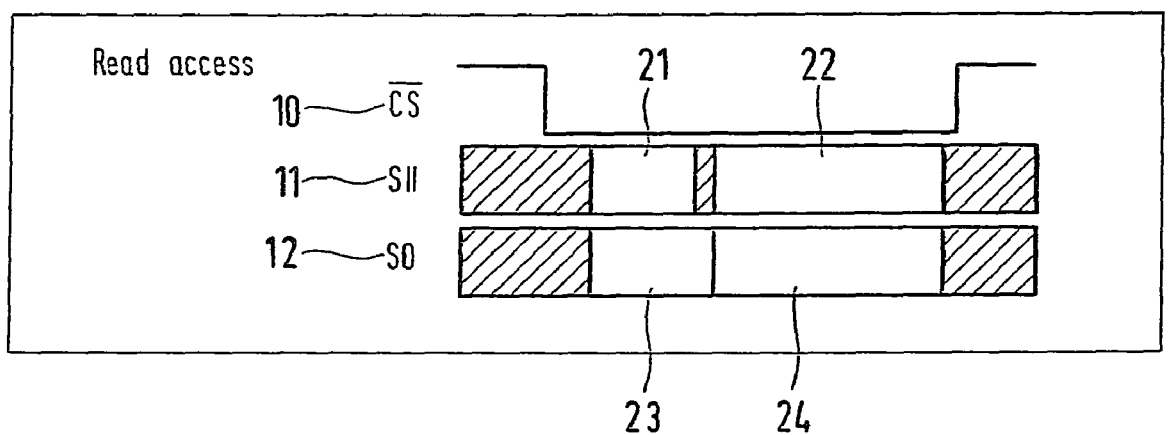
FIG. 3 shows a sensor data transmission from the sensor to the processor.

FIG. 3 shows the data transmission from the sensor to the processor for transmitting a 12-bit data word which contains the acceleration and yaw rate information, i.e., this 12-bit data word is transmitted in row 12 in field 24, while the corresponding read instruction is transmitted to the sensor in field 21 of row 11. The information in field 22 of this row is not processed by the sensor in the present case, i.e., it is irrelevant. Field 23 of row 12 contains status and error information transmitted to processor 2.

What is claimed is:

1. A control unit comprising:
   a housing;
   a processor situated in the housing;
   at least one inertial sensor situated in the housing; and
   a serial synchronous interface for providing a data transmission;
   wherein the data transmission is between the processor and the at least one inertial sensor and is in digital form, and
   wherein the data transmission is configured in such a way that transmitted data has at least one error bit and at least one status bit, the at least one error bit enabling detection and identification of data transmission errors, and the at least one status bit enabling recognition of an operating state of the at least one inertial sensor,
   wherein the data transmission is configured for at least one of the following: (i) to be bidirectional, (ii) triggering a sensor test, (iii) triggering a sensor-internal offset regulation of the at least one inertial sensor, (iv) triggering a switch-over from one operating state to another operating state of the at least one inertial sensor,
   wherein four lines are provided for the data transmission, one of the lines being for selecting the at least one inertial sensor,
   wherein the at least one inertial sensor has a multi-channel design, and
   wherein the status bit indicates one of (i) a running sensor test, (ii) an offset regulation mode, and (iii) an initialization phase.

2. The control unit according to claim 1, wherein the data transmission is configured to be bidirectional.

3. The control unit according to claim 1, wherein the data transmission is configured for triggering a sensor test.

4. The control unit according to claim 1, wherein the data transmission is configured for triggering a sensor-internal offset regulation of the at least one inertial sensor.

5. The control unit according to claim 1, wherein the data transmission is configured for triggering a switch-over from one operating state to another operating state of the at least one inertial sensor.

6. The control unit according to claim 1, wherein the control unit is part of a restraint system.

7. The control unit according to claim 1, wherein the control unit is part of a vehicle dynamics control system.

8. The control unit according to claim 1, wherein the control unit is part of a sensor cluster.

9. The control unit according to claim 1, wherein the control unit is part of a vehicle navigation system.

10. The control unit according to claim 1, wherein the status bit indicates a running sensor test.

11. The control unit according to claim 1, wherein the status bit indicates an offset regulation mode.

12. The control unit according to claim 1, wherein the status bit indicates an initialization phase.

13. The control unit according to claim 1, wherein the control unit is part of a sensor box.

* * * * *